March 12, 1963  H. H. RICHMOND  3,081,291
ETHYLENE POLYMERIZATION WITH A CATALYST CONTAINING
A CHROMIUM SALT OF A SOLID POLYMER
CONTAINING METHACRYLIC ACID Filed May 7, 1959  2 Sheets-Sheet 2

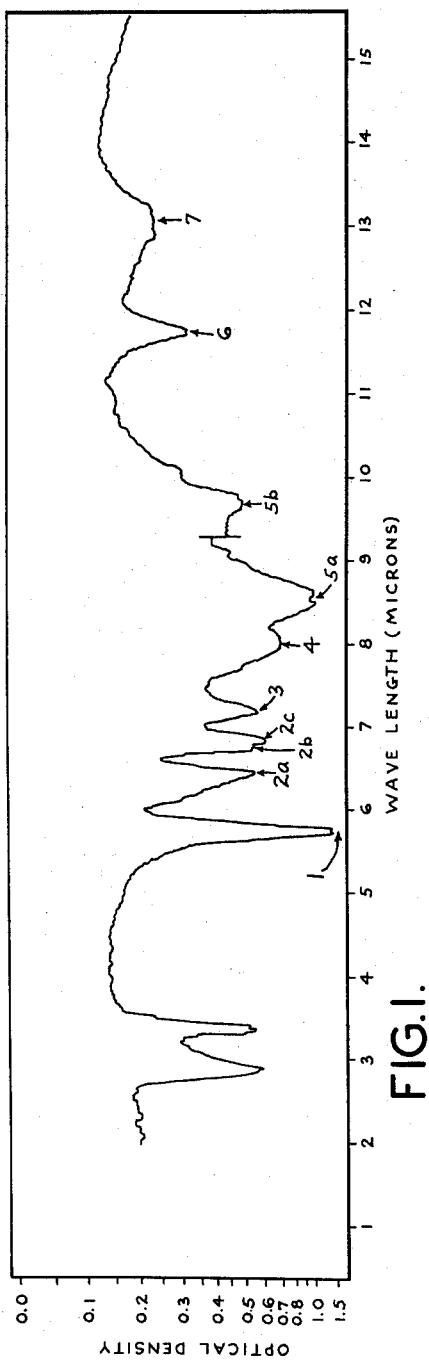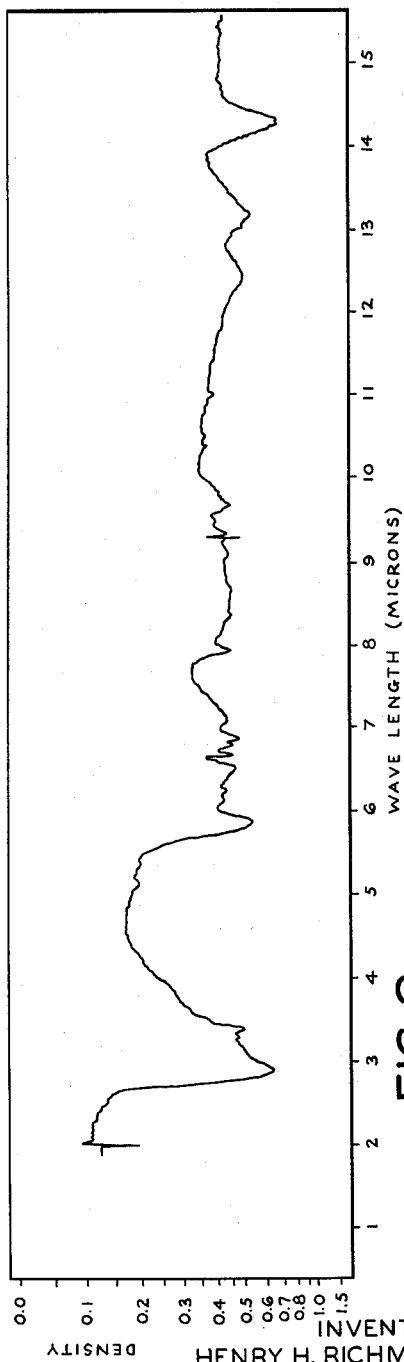

INVENTOR
HENRY H. RICHMOND
BY
*Robert A. Harman*
ATTORNEY

United States Patent Office 3,081,291
Patented Mar. 12, 1963

3,081,291
ETHYLENE POLYMERIZATION WITH A CATALYST CONTAINING A CHROMIUM SALT OF A SOLID POLYMER CONTAINING METHACRYLIC ACID
Henry H. Richmond, Morristown, N.J., assignor to Allied Chemical Corporation, New York, N.Y., a corporation of New York
Filed May 7, 1959, Ser. No. 811,734
3 Claims. (Cl. 260—94.9)

This invention relates to process for polymerizing gaseous olefins to solid polymers in presence of certain polymeric chromium, molybdenum and vanadium salts, and to particular such salts per se.

It has been proposed to polymerize ethylene, propylene, and other gaseous olefins to solid polymers at relatively low pressures and at relatively low temperatures in presence of an organic heavy metal compound, such as chromium acetylacetonate, reacted with a metal compound reducing and dehydrating agent such as an aluminum trialkyl, usually dispersed in a hydrocarbon solvent. In such operations the reaction rate is low, typically about 0.1, expressed as grams of polymer formed per unit of (grams of chromium compound employed) × (hours of reaction time) × (percent chromium in the chromium compound) i.e. as grams of polymer/grams of catalyst/hours of reaction time/percent chromium content of catalyst, indicated below as g./g./hr./1% Cr. Moreover in the products formed, the content of heavy metal is usually appreciable, e.g. about 0.4%, so that operations for its removal from the polymer product are usually required.

I have now discovered that relatively high rates are obtainable together with low contents of heavy metal in the polyethylene product by using as organic heavy metal compound to catalyze ethylene polymerization to solid polymers, a chromium, molybdenum, or vanadium salt of an organic acid which acid has a plurality of carboxy and/or sulfo substituents in an organic polymeric substrate. The amount of said metal in said salt is preferably restricted, as in the examples below, to not above 10% by weight of the said metals, especially about 0.1% to about 5% by weight of chromium whereby high dispersion, through the polymer, of the metal polymerization centers is possible. Salts containing larger proportions of said metals are useable and the amount of said metals can be as small as 0.01% by weight of the salt.

The carboxy and/or sulfo substituents of my catalysts are integrally bound to the polymeric substrate, e.g. as in acrylic acid or methacrylic acid polymers (including copolymers and graft polymers). The chromium, molybdenum, or vanadium is believed to be bound chiefly as its trivalent salt with acid substituents in the polymeric substrate; but to a greater or lesser extent, depending upon the particular reactants and conditions employed in preparing the compositions, at least the chromium therein will also be complexed with the acid and/or other substituent groups.

The acid polymer employed in forming my salts should be produced so as to have large surface area, preferably at least about 1 sq. meter per gram as measured by the standard B-E-T adsorption method using nitrogen gas. For purposes of improving dispersion of active centers and/or increasing the catalyst surface area, my salts can be supported on an extender such as a thermoplastic, e.g. polystyrene, polyethylene, etc.

The simplest polymer of the type used to make my salt catalysts is acrylic acid homopolymer. A chromium salt thereof can be made by converting the polycarboxylic acid to sodium salt and adding a salt of trivalent chromium such as chromic chloride at acid pH such as 4.5. The salt which is formed is, after washing, substantially free of inorganic anions such as chloride.

I have discovered that particularly active compounds are the said salts of copolymers of an acrylic acid, especially copolymers of methacrylic acid (i.e. alpha-methacrylic acid) with a major proportion by weight of ethylenically unsaturated neutral monomer such as especially a vinyl ester or vinyl hydrocarbon e.g. methyl methacrylate and styrene. Still more particularly, I have discovered that highly active compounds are the said salts containing about 0.1%–5% by weight of chromium as the cation. The above salts are new compounds, so far as I am aware.

Other polymers having carboxy substituents which can be used to form my salts include alpha-chloracrylic acid homopolymers and copolymers, crotonic acid copolymers, maleic acid copolymers, etc.; and the equivalent poly acids formed by hydrolysis of polynitriles, polyesters, etc. such as hydrolyzed polyacrylonitriles, hydrolyzed polyacrylic esters, hydrolyzed polymethacrylic esters, etc.

Polymers containing sulfo substituents which can be used to form my salts include sulfonated styrene polymers; sulfolignins; sulfonated phenol-formaldehyde resins; etc. In general, resins capable of cation exchange reactions can be used provided the resins are in a form in which they take up appreciable quantities of the metal, e.g. chromium, when contacted with a solution of the metal compound. Thermoplastic polymers will generally be preferred over thermoset polymers, as being more easily converted to salts by action of solutions of metal compounds and as avoiding difficulties of gel formation when left in polyolefin products which are subjected to heat treatment, e.g. depolymerization, extrusion, etc.

The principles upon which my process operates are not entirely clear; however one factor in its success is believed to be that the chromium or other metal is well dispersed over the surface of the polymeric acid. Thereby it is believed, numerous distinct catalytically active metal atoms are provided, rather than clusters of metal compound molecules adsorbed at particular sites on a support such as an inorganic support. Conformably thereto, it appears that large surface area polymer as formed by heterogeneous polymerization in a non-solvent medium, e.g. by emulsion or gas phase heterogeneous polymerization, forms upon reaction with chromium, when the polymer remains undissolved, a particularly active material.

The polymers obtained by my process typically have crystallinities determined by infrared spectrum of about 75%–87% and molecular weights measured by standard viscosity methods in the range of about 1 million to about 10 million. These molecular weights can readily be reduced when desired by heating the product in absence of oxygen at about 350° C. Such heat treatment usually produces an increase of crystallinity by a few percentage units.

FIG. 1 herein is an infrared absorption spectrum of a preferred salt of my invention, described in detail in Example 1 below;

FIG. 2 is a like spectrum of the salt of Example 5A below;

Figure 3:
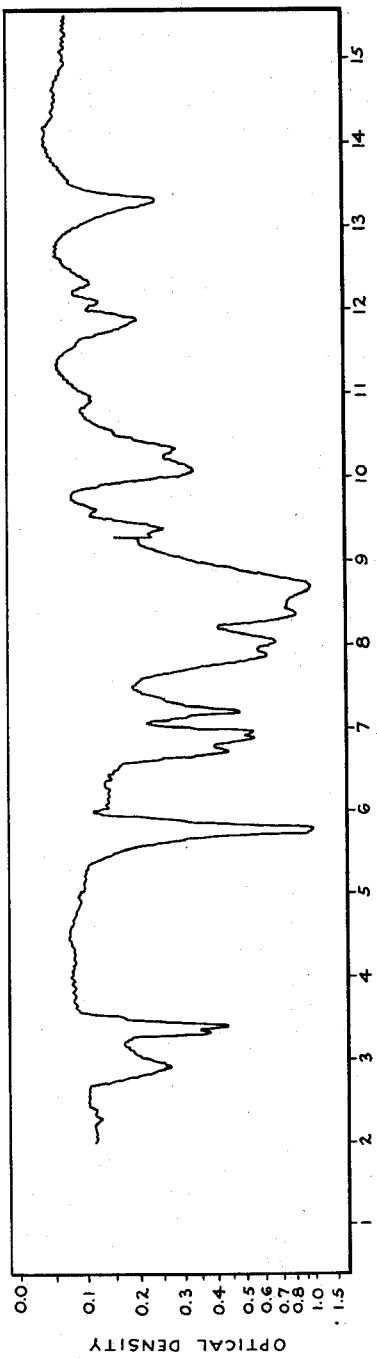
FIG. 3 is a like spesctrum of the salt of Example 6 below.

The examples which follow describe specific embodiments of my process and composition of matter and are illustrative of the best mode contemplated by me for carrying out my invention. Nevertheless the invention is not to be considered as limited to all details of the examples.

The ethylene and solvents used in the below examples were thoroughly purified to remove any constituents reactive, like oxygen, with sodium benzophenone and to remove any moisture.

Where, in the examples below, a certain weight of e.g. a 30% aluminum triisobutyl solution is stated to be employed, the stated weight refers to the weight of aluminum triisobutyl in the solution; whereas stated volumes of such solutions include the solvent.

EXAMPLE 1

*Chromium Salt of 90/10 Copolymer Methyl Methacrylate and Methacrylic Acid*

A 90/10 copolymer of methyl methacrylate and methacrylic acid was prepared in emulsion. To a 12 oz. crown cap bottle there was charged 100 grams water, 45 grams methyl methacrylate monomer, 5 grams glacial methacrylic acid, 2.5 grams Nacconol NRSF (a salt-free sodium alkylaryl sulfonate detergent), 0.5 gram sodium persulfate, 0.05 gram sodium bisulfite. The bottle was flushed with nitrogen, closed, and agitated in a launderometer for 4 hours at 50° C.

The emulsion was broken and the copolymer precipitated with about 100 ml. of methanol; the copolymer was filtered and washed thoroughly with water to remove the sodium salts.

The copolymer weighing 50 grams was dispersed in 4 liters of methanol, in a Waring Blendor with heating. To the colloidal solution in methanol there was added under agitation a solution of 6.36 grams of sodium carbonate in 42 grams methanol and sufficient water to produce the solution. Only sufficient sodium carbonate solution was added to bring the pH to 4.6. The solution was filtered to remove any possible sodium carbonate present. The pH was followed carefully in order to avoid in the next step the formation of chromium carbonate which does not form until a pH of 5.0 to 6.0.

A solution of 24 grams of chromic chloride hexahydrate in 100 ml. of methanol was added under agitation to the filtered colloidal solution of the sodium salt of the 90/10 copolymer. No precipitate appeared. The pH, which had dropped to 2.0, was raised to 4.0 by the addition of a 7.5% solution of sodium methoxide in methanol. The blue precipitate was filtered off and washed free of chloride. The dried product which weighed 45.2 grams was ground.

An analysis showed that the dry product contained 0.81% chromium. It was insoluble in water and solvents generally, but had some tendency to swell in hydrocarbon solvents such as hexane and xylene.

The infrared absorption spectrum of the composition containing chromium is shown in the accompanying FIG. 1, wherein optical density is plotted against wavelength of the incident beam in microns. The composition was mixed at concentration of 0.5 weight percent with potassium bromide and pressed into a disc, optical density of which was determined. Characteristic peaks are numbered in the figure, and are as follows:

(1) At 5.75 microns, present in the spectrum of methyl methacrylate polymer but not in that of sodium methacrylate polymer;

(2a) At 6.45 microns
(2b) At 6.8 microns
(2c) At 6.88 microns all probably due to carbonyl ions. As compared to like peaks in the spectrum of sodium methacrylate polymer these peaks are slightly shifted to the right, the corresponding peaks for sodium methacrylate polymer being (a) a very strong twin peak at 6.35 and at 6.42 microns, and (b) a peak at 6.82 microns. The methyl methacrylate polymer spectrum lacks a peak corresponding to that at 6.45 microns.

(3) At 7.21 microns, also present in the spectrum of methyl methacrylate polymer but not in that of sodium methacrylate polymer.

(4) At 7.9–8.1 microns, present in sodium methacrylate polymer spectrum at 8.02 microns and absent from methyl methacrylate polymer spectrum.

(5a) At 8.5–8.65 microns
(5b) At 9.65–9.75 microns present in methyl methacrylate polymer spectrum but not in sodium methacrylate polymer spectrum.

(6) At 11.75 microns a medium broad peak which may correspond to either or both of two peaks in the sodium methacrylate polymer spectrum at 11.68 and 11.95 microns. No corresponding peak is present in the methyl methacrylate polymer spectrum.

(7) At 12.8–13.25 microns, not present in the sodium methacrylate or methyl methacrylate polymer spectra.

The chromium salt was evaluated in ethylene polymerization in the following manner:

To a 320 ml. stainless steel bomb which was placed in a dry box which had been flushed with nitrogen there was charged a suspension of 1.5 grams of the chromium salt in 65 ml. of purified dried xylene, which suspension had been dried and activated by heating at the reflux temperature for 6 hours, with water being condensed from the resulting vapors and removed in a Dean-Stark trap; and thereafter had been maintained under dry nitrogen. Then there was added 9 ml. of a 30% solution of aluminum triisobutyl in purified dried xylene under nitrogen.

The bomb was closed and rocked at 65° C. while pressure therein was maintained by periodic additions of ethylene gas, in the range of 170–400 p.s.i.g. for 6.3 hours.

There resulted 61.5 grams of solid polyethylene product. Accordingly the polymer:chromium salt weight ratio was 41:1; the rate of polymer formation was 8 grams per unit of (grams of chromium compound employed) × (hours of reaction time) × (percent chromium in the chromium compound) i.e. 8 grams/gram of chromium catalyst/hour/percent chromium content of the catalyst, or 800 grams per hour per gram of chromium in the catalyst. The chromium content of the product was only 0.02% by weight. The intrinsic viscosity of the product was 16.3 in units of deciliters per gram, corresponding to calculated weight average molecular weight of about 3.5 million. The viscosity was lowered by heat treatment at 350° C. for 6 hours under nitrogen. The heat treated polymer showed crystallinity by infrared of about 87%.

EXAMPLE 2

*Chromium Salt of 90/10 Copolymer of Methyl Methacrylate and Methacrylic Acid*

This chromium salt was prepared by the same procedure described in Example 1 except that rather than being broken, the emulsion of polymeric acid was agitated in a Waring Blendor with addition of 10% aqueous sodium carbonate solution until the pH reached 8.0; and the mixture was then added under agitation to 100 ml. of 10% aqueous chromic nitrate solution. The pH during this step remained below 4.5. Analysis of the resulting precipitate, washed and dried, showed 1.6% chromium and 0.2% nitrogen. This analysis indicates that the chromium salt contains some nitrate groups, but considerably below the quantity calculated for an acido complex with chromic nitrate having the observed chromium content. Accordingly a minor proportion of the chromium apparently was bound in complex form rather than salt form.

This chromium salt was evaluated in ethylene polymerization by procedure the same as in Example 1, except that the slurry of chromium salt contained 0.08 gram of the salt in 50 ml. of purified, dried hexane; 1.0 gram of 30% aluminum triisobutyl solution in purified dried hexane was added; and the reaction was continued for 48 hours at 67° C. and 190–300 p.s.i.g. The resulting polyethylene weighed 28.0 grams, corresponding to 350 grams per gram of chromium salt or about 22,000 grams per gram of chromium, formed at the rate of 455 grams of polyethylene per gram of chromium per hour (4.5 g./g./hr./1% chromium on the basis given in Example 1). Its intrinsic viscosity was 22.3 deciliters per gram, corresponding to weight average molecular weight of about 6 million; and its chromium content was not above 45 parts per million by weight.

EXAMPLE 3

*Chromium Salt of 50/50 Copolymer of Methyl Methacrylate and Acrylic Acid*

To a crown cap bottle there was charged 25 grams methyl methacrylate 25 grams glacial acrylic acid, 2.5 grams Nacconol NRSF sodium alkylaryl sulfonate detergent, 0.5 gram sodium persulfate, 0.05 gram sodium bisulfite and 100 grams water. The bottle was flushed with nitrogen, closed, and agitated in the launderometer for 3 hours. The polymerization was not complete. The unpolymerized materials were decanted.

The solid polymer was dispersed and brought in a Waring Blendor from a pH of 4.7 to 8.0 with 12 ml. of a 26.5 gram/100 ml. water solution of sodium carbonate. A solution of 199 grams chromic chloride hexahydrate in 500 ml. of water was added under agitation so that the pH reached 2.7. The large excess of chromic chloride was used as a means of controlling the final acidity. The precipitated blue product was filtered, air dried and ground. The dried product weighed 11.3 grams. The chromium content on analysis was 7.5%.

This chromium salt was evaluated in ethylene polymerization by like procedure to that of Example 1. The bomb charge consisted of 0.5 gram chromium salt dried and activated in 50 ml. of purified, dried xylene and 2.0 grams of 30% aluminum triisobutyl solution in xylene. The polymerization was carried out at 68° C. and 100–425 p.s.i.g. pressure, maintained by ethylene additions, for 7.5 hours.

There was obtained 75 grams of solid polyethylene. The product:chromium salt weight ratio was therefore 150:1 and the rate of polymerization was 20 grams of polyethylene formed per unit of (grams of chromium salt employed)×(hours), or about 2.7 on the unit basis used in Example 1. The chromium content of the product was only about 0.05% by weight. The intrinsic viscosity of the product was 16.1 deciliters per gram, corresponding to weight average molecular weight of about 2.4 million.

EXAMPLE 4(A)

*Chromium Polyacrylate*

To 100 ml. of a 10% aqueous solution of chromic chloride hexahydrate agitated in a Waring Blendor there was added a 1% solution of sodium polyacrylate until the pH reached 4.5. The initial precipitate was sticky but on agitation became granular. The precipitate was filtered, washed free of salts and dried in an oven at 60° C. The chromium content of the dry product was 7.4%. The chromium content indicates that chromium salt formation in the acid medium was incomplete.

The chromium salt was evaluated in ethylene polymerization by procedure like that of Example 1. The charge was 0.5 gram chromium salt, dried and activated in 60 ml. of purified, dried xylene; and 2 ml. of 30% aluminum triisobutyl solution in purified, dried hexane. The polymerization was carried out at 70° C. and 260–380 p.s.i.g., maintained by ethylene additions, for 7 hours.

There was obtained 15 grams of polymer. The product:chromium salt weight ratio was accordingly 30:1; the chromium content of the product was about 0.25%; and the rate of polymerization was about 0.6 on the unit basis used in Example 1.

EXAMPLE 4(B)

Polystyrene was prepared by emulsion polymerization like that of Example 1, using 40 grams of styrene in 100 grams of water containing 2.5 grams of sodium alkylaryl sulfonate detergent, 0.5 gram of sodium persulfate, and 0.05 gram of sodium bisulfite. To the emulsion was added under agitation in a Waring Blendor a solution, in 144 ml. of water, of 72 grams of 15% sodium polyacrylate aqueous solution having a pH at 25° C. about 8.5, viscosity (Brookfield) at 25° C. about 24,000 centipoises and specific gravity 1.07 (said 15% solution being commercially available as "Polyco 269W"). Then the resulting mixture was added with agitation to a solution of 12.3 grams of chromic chloride hexahydrate in 100 ml. of water. The resulting product was filtered, washed, and dried. The chromium content of the dry product was 0.54% by weight.

The product was evaluated in ethylene polymerization generally as in Example 1, using a charge to the bomb of 0.95 gram of catalyst dried and activated in 50 ml. of purified, dried hexane; and 1.2 ml. of 30% aluminum triisobutyl solution in purified, dried hexane. Polymerization was at 67° C. and 150–300 p.s.i.g. pressures maintained by additions of ethylene, for 7.3 hours.

Solid polyethylene was formed amounting to 30.0 grams, corresponding to a rate of 800 grams per hour per gram of chromium, or 8.0 g./g./hr./1% chromium. Its weight average molecular weight calculated from intrinsic viscosity was about 5 million (intrinsic viscosity of 21 deciliters per gram); its terminal vinyl unsaturation (measured by infrared spectrum) was 1.3 double bonds per 1000 carbon atoms, and was about half the total unsaturation; and its crystallinity (measured by infrared spectrum) was 82.5%.

EXAMPLE 5(A)

*Chromium Salt of 50/50 Copolymer of Styrene and Methacrylic Acid*

To a 12 oz. crown cap bottle there was charged 25 grams of styrene, 25 grams glacial methacrylic acid, 100 grams water, 2.5 grams Nacconol NRSF sodium alkylaryl sulfonate detergent, 0.5 gram sodium persulfate and 0.05 gram sodium bisulfite. The bottle was flushed with nitrogen, closed, and agitated in a launderometer for 4 hours at 50° C. To the emulsion there was added aqueous 10% sodium carbonate solution with agitation in a Waring Blendor until the pH reached 8.0.

The resultant mixture was added under agitation to an aqueous solution containing 39.9 grams of chromic chloride hexahydrate; the pH of the mixture remained below 4.5. The precipitate was then filtered off, washed free of chloride, dried at 60° C. and ground. Analysis showed that the dry precipitate contained 4.4% chromium.

FIG. 2 of the accompanying drawings shows the infrared spectrum of the chromium-containing composition, prepared as for that of FIG. 1. The positions of the significant peaks are generally as discussed in Example 1 in connection with FIG. 1, the differences being attributable to substitution of styrene as the non-acidic ingredient instead of methyl methacrylate. In this 50/50 styrene/methacrylic acid chromium salt the peaks at 2.9 microns and 3.4 microns are notably broadened into the intermediate area, as compared to those in the 90/10 methyl methacrylate/methacrylic acid chromium salt.

This chromium salt was evaluated in ethylene polymerization by procedure like that of Example 1. The bomb was charged with 0.4 gram of the chromium salt dried and activated in 50 ml. of purified, dried hexane; and with 3 ml. of 30% aluminum triisobutyl solution in purified, dried xylene. The reaction was carried out at 70° C. and at pressures maintained at 200–400 p.s.i.g. by ethylene additions for 7.5 hours.

There was obtained 42.5 grams of solid polyethylene. The product:chromium salt weight ratio was 106:1; the rate of polymerization was 3.2 on the unit basis used in Example 1; and the chromium content of the product was only about 0.04% by weight. The intrinsic viscosity of the product was 17.9 deciliters per gram, corresponding to weight average molecular weight of about 4 million.

EXAMPLE 5(B)

A 50/50 copolymer of styrene and methacrylic acid was produced as in Example 5(A) and converted to sodium salt by adding aqueous 10% sodium carbonate solution to pH of 8, as in Example 5(A).

This sodium salt suspension was added with stirring to 192 grams of aqueous chromic chloride solution containing 19.2 grams of chromic chloride hexahydrate, at a rate to keep the pH below 4.5. A blue solid composition was formed which was filtered off, washed with water until free of soluble salts, and air dried. It contained 4.15% by weight of chromium.

This composition was evaluated in an 1800 ml. stainless steel bomb in ethylene polymerization generally as in the above examples, using 0.10 gram of the chromium salt activated and dried in 50 ml. of purified, dried hexane; 1.25 grams of 30% aluminum triisobutyl solution in purified, dried hexane; 65° C. and 0–300 p.s.i.g. pressure, maintained by ethylene gas additions for a period of 80 hours.

The product was 109 grams of solid polyethylene of intrinsic viscosity 10.4, produced at an overall rate of 3.3 g./g./hr./1% chromium, and containing not above 40 parts of chromium by weight per million parts of polyethylene.

EXAMPLE 6

The chromium catalyst evaluated in this run was the chromium salt of an emulsion copolymer of 90% methyl methacrylate and 10% crotonic acid. The salt was prepared in the general manner employed in Example 2: A mixture of 45 grams methyl methacrylate and 5 grams crotonic acid was charged to a 12-oz. crown cap bottle together with 100 grams of water, 2.5 grams Nacconol NRSF sodium alkylaryl sulfonate detergent, 0.5 gram sodium persulfate and 0.05 gram sodium bisulfite. The bottle was flushed with nitrogen, closed and agitated in a launderometer for 4 hours at 50° C. An emulsion of polymer was formed except for a lump of 4 grams of material which was removed.

To half of the remaining emulsion there was added with agitation in a Waring Blendor a solution of 1.54 grams sodium carbonate in 10 cc. of water.

The resulting sodium salt was added with agitation to a solution of 5.64 grams of chromic nitrate in 50 ml. of water. The precipitated chromium catalyst was filtered, washed with water till free of soluble salts and dried. The weight of product was 24.7 grams containing 0.95% chromium.

The infrared spectrum of this salt, prepared as for that of FIG. 1, is shown in FIG. 3. In general it resembles the spectrum of the methyl methacrylate/methacrylic acid chromium salt of FIG. 1; but it lacks a definite peak at 6.45 microns, being instead flattened over the range 6.0–6.6 microns; and contains peaks at 9.41 microns, 10.35 microns, 10.95 microns, 12.1 microns, and 12.35 microns all lacking in the spectrum of FIG. 1. The spectrum of FIG. 3 contains a peak at 11.9 microns which may correspond to the peak at 11.75 microns of FIG. 1 and a peak at 13.32 microns which may correspond to the long wave end of the very broad peak around 13 microns of FIG. 1. The peak of FIG. 3 at 9.65 microns is considerably weaker than the corresponding peak of FIG. 1.

A one gram portion of this salt was azeotroped as in Example 1 with 50 ml. of purified, dried hexane under nitrogen for 6 hours to remove traces of moisture and then charged to a 320 ml. stainless steel bomb under nitrogen. There was then added one gram of a 30% solution of aluminum triisobutyl in purified, dried hexane. The bomb was closed, placed in the shaker mechanism and pressurized with ethylene. The polymerization was carried out at 65° C. and 200–340 p.s.i.g. maintained by ethylene additions, for 6.25 hours. There was obtained 14.4 grams of solid polyethylene product; the rate of polymerization was 2.5 g./g./hr./1% chromium. The intrinsic viscosity of the product polyethylene was 19.6 deciliters per gram.

EXAMPLE 7

The catalyst evaluated was the molybdenum salt of a 90/10 emulsion copolymer of methyl methacrylate and methacrylic acid containing 3.74% molybdenum.

The molybdenum salt was made in the following manner. To an aqueous emulsion a 90/10 copolymer of methyl methacrylate and methacrylic acid containing 15 grams of copolymer, prepared as in Example 1 above, there was charged with agitation in a Waring Blendor a 10% solution of sodium carbonate containing 1.86 grams of solute, bringing the pH to 8.

To the agitated sodium salt solution there was added 1.8 grams of molybdenum pentachloride. The precipitated molybdenum salt was filtered, washed free of salt and air dried. Analysis showed 3.74% molybdenum.

Figure 4:
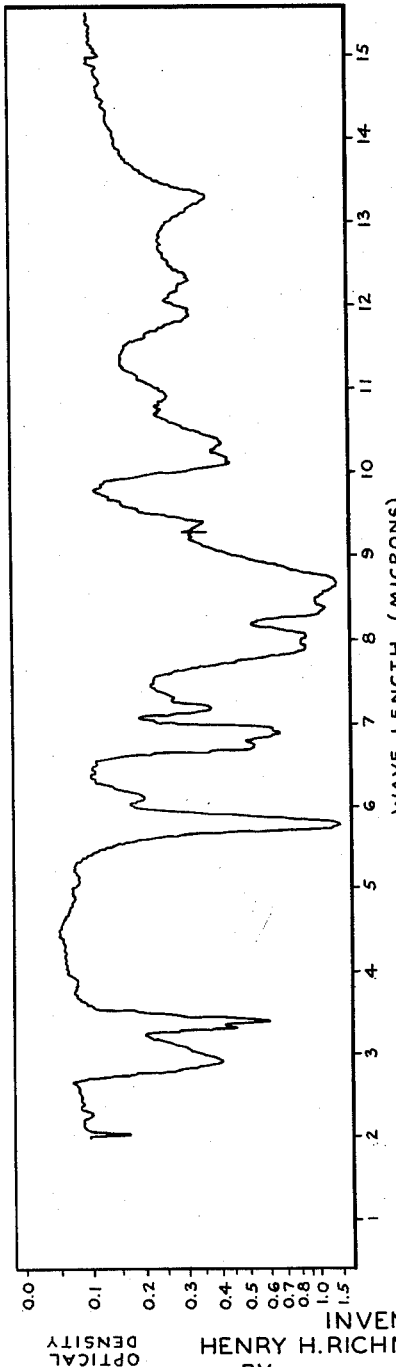
FIG. 4 is a like spectrum of the salt of Example 7 below.

The infrared spectrum of this salt, prepared as for that of FIG. 1, is shown in FIG. 4. It resembles FIG. 1 in most of the peaks, but lacks peaks at 6.45 microns and at 9.65–9.75 microns; and like FIG. 3 it contains peaks at 9.41 microns, 10.35 microns, 10.95 microns, 11.9 microns and 13.32 microns.

The peak of FIG. 4 at 6.1 microns is found in the spectrum of sodium methacrylate polymer and that of methyl methacrylate polymer; it appears to correspond to the broadening of the 6.45 microns peak of FIG. 1 and to the short wave end of the flattened range 6.0–6.6 microns in FIG. 3.

The broad peak of FIG. 4 at 12.15–12.55 microns appears to correspond to the two peaks at 12.1 and 12.35 microns of this same region in the spectrum (FIG. 2) of the chromium salt of styrene/methacrylic acid copolymer; and a broad peak at 12.0–12.3 microns in the spectrum of methyl methacrylate polymer but no such peak in the spectrum of sodium methacrylate polymer.

A 320 ml. stainless steel bomb was charged with 0.5 gram of the above salt, dried by azeotroping with 50 ml. of purified, dried hexane. Then 1.2 grams of a 30% solution of aluminum triisobutyl in purified, dried hexane was added. After pressuring with ethylene the polymerization was carried out at 70° C. and 130–275 p.s.i.g., maintained by adding ethylene, for 8.75 hours. There was obtained 5.5 grams of product. The intrinsic viscosity of the polyethylene produced was 26 deciliters per gram, corresponding to weight average molecular weight of about 7 million. The crystallinity of this polyethylene was 79% as determined by infrared spectrum.

When a vanadium salt of a 90/10 emulsion copolymer of methyl methacrylate/methacrylic acid is prepared and tested by the procedure of this Example 7, but substituting vanadium pentachloride or vanadium oxychloride for molybdenum pentachloride, like results to those of Example 7 are obtained.

In line with the technique used in their preparation and by analysis my salts, e.g. my chromium salts, are free of metal ions of high valence, e.g. $Cr^{VI}$. Accordingly I believe the metal therein is trivalent; and in view of the spectra above discussed I believe the metal is essentially electrovalently bound. Said bonding, leaving the metal free for complexing, is believed to contribute to the catalytic activity of my salts.

In the above examples, for purposes of comparison, essentially the same conditions of polymerization and specifically the same reducing agent (i.e. aluminum triisobutyl) have been used with each of the polymeric salts. The conditions used are representative of the best mode contemplated by me for practising my invention; nevertheless a wide variety of conditions and of reducing agents known to the art can be used. Suitable reducing agents include generally those based on metals of groups I, II and III of the periodic table. The usable olefin is not confined to ethylene but includes gaseous olefins and their mixtures generally, e.g. mixtures of ethylene and propylene.

I claim:
1. The improvement in processes for polymerizing ethylene to solid polymers in presence of an organic compound of chromium together with a reducing-dehydrating metal compound activator which comprises utilizing as said chromium compound a salt of chromium and a solid methacrylic acid copolymer with a major proportion by weight of ethylenically unsaturated neutral comonomer formed by heterogeneous polymerization in a non-solvent medium, the chromium salt being formed from said polymer without dissolving polymer and containing between about 0.1% and about 5% by weight of chromium, said chromium being trivalent and electrovalently bound in said salt.

2. Improvement as defined in claim 1 wherein the copolymer is a methacrylic acid/methyl methacrylate copolymer containing a major proportion of methyl methacrylate.

3. Improvement as defined in claim 1 wherein the copolymer is a methacrylic acid/styrene copolymer containing a major proportion of styrene.

References Cited in the file of this patent
UNITED STATES PATENTS

| | | |
|---|---|---|
| 2,502,411 | Neher et al. | Apr. 4, 1950 |
| 2,825,711 | Mayfield | Mar. 4, 1958 |
| 2,846,427 | Findlay | Aug. 5, 1958 |

FOREIGN PATENTS

| | | |
|---|---|---|
| 549,804 | Belgium | July 25, 1956 |

OTHER REFERENCES

Stereoregular Addition Polymers, Interscience Publishers Inc., New York, pages 157–158.